United States Patent
Broecheler

(10) Patent No.: US 11,423,085 B2
(45) Date of Patent: *Aug. 23, 2022

(54) GRAPH DATABASE SUPER VERTEX PARTITIONING

(71) Applicant: DataStax, Inc., Santa Clara, CA (US)

(72) Inventor: Matthias Broecheler, Seattle, WA (US)

(73) Assignee: DataStax, Inc., Santa Clara, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 16/786,244

(22) Filed: Feb. 10, 2020

(65) Prior Publication Data

US 2020/0242167 A1 Jul. 30, 2020

Related U.S. Application Data

(63) Continuation of application No. 15/214,312, filed on Jul. 19, 2016, now Pat. No. 10,606,892.

(51) Int. Cl.
*G06F 16/00* (2019.01)
*G06F 16/901* (2019.01)

(52) U.S. Cl.
CPC .................. *G06F 16/9024* (2019.01)

(58) Field of Classification Search
None
See application file for complete search history.

(56) References Cited

U.S. PATENT DOCUMENTS

| | | |
|---|---|---|
| 5,706,503 A | 1/1998 | Poppen |
| 7,861,226 B1 * | 12/2010 | Episkopos .......... G06F 11/3696 717/124 |
| 2011/0029571 A1 | 2/2011 | Aggarwal |
| 2012/0317142 A1 | 12/2012 | Broecheler |
| 2013/0166600 A1 | 6/2013 | Snyder, II |
| 2013/0275429 A1 | 10/2013 | York |
| 2014/0280362 A1 | 9/2014 | Henderson |
| 2014/0310302 A1 | 10/2014 | Wu |
| 2014/0337373 A1 | 11/2014 | Morsi |
| 2015/0026158 A1 | 1/2015 | Jin |
| 2015/0033106 A1 | 1/2015 | Stetson |
| 2015/0067695 A1 * | 3/2015 | Hamamoto .......... G06F 9/5066 718/104 |
| 2015/0269279 A1 | 9/2015 | Bosshart |
| 2015/0381756 A1 | 12/2015 | Lotfallah |
| 2016/0173340 A1 | 6/2016 | Latham |
| 2016/0188656 A1 | 6/2016 | Ekanadham |
| 2016/0212022 A1 | 7/2016 | Abou Mahmoud |
| 2016/0350662 A1 | 12/2016 | Jin |

(Continued)

OTHER PUBLICATIONS

Katarina Grolinger et al: 'Data management in cloud environments: NoSQL and NewSQL data stores', Journal of Cloud Computing, vol. 2, No. 1, Dec. 18, 2013, pp. 1-24.

(Continued)

*Primary Examiner* — Anhtai V Tran
(74) *Attorney, Agent, or Firm* — Van Pelt, Yi & James LLP

(57) ABSTRACT

In partitioning a graph database, a plurality of vertices of the graph database is assigned to a plurality of nodes. The vertices of the graph database are connected by edges that indicate relationships between the vertices. A vertex of the graph database is designated as a super-vertex that is split into a truncated vertex and at least one vertex representative.

18 Claims, 12 Drawing Sheets

[Flowchart:
702 — Detect that a super-vertex meets a criteria to be split/partitioned
704 — Partition a portion of the detected super-vertex to one or more vertex representatives assigned to one or more remote nodes]

(56) References Cited

U.S. PATENT DOCUMENTS

2017/0068746 A1\* 3/2017 Levin .................... G06F 16/278
2017/0104668 A1 4/2017 Zhang

OTHER PUBLICATIONS

Albanese et al., PLINI: A Probablistic Logic Program Framework for Inconsistent News Information, 2011.
Bach et al., Hinge-Loss Markov Random Fields and Probablistic Soft Logic, May 17, 2015.
Bach et al., Scaling MPE Inference for Constrained Continuous Markov Random Fields with Consensus Optimization, 2012.
Bröcheler et al., A Budget-Based Algorithm for Efficient Subgraph Matching on Huge Networks, 2011.
Bröcheler et al., Computing Marginal Distributions over Continuous Markov Networks for Statistical Relational Learning, 2010.
Bröcheler et al., COSI: Cloud Oriented Subgraph Identification in Massive Social Networks, 2010.
Bröcheler et al., DOGMA: A Disk-Oriented Graph Matching Algorithm for RDF Databases, Oct. 25-29, 2009.
Bröcheler et al., Efficient Multi-View Maintenance in the Social Semantic Web, Apr. 2012.
Bröcheler et al., Probablistic Similarity Logic, 2010.
Bröcheler et al., Probablistic Similarity Logic, 2012.
Broecheler et al., A Scalable Framework for Modeling Competitive Diffusion in Social Networks, 2010.
Kernal Erdogan: "A Model to Represent Directed Acyclic Graphs (DAG) on SQL Databases", Jan. 14, 2008, pp. 1-16, retrieved from Internet, URL: http://www.codeproject.com/Articles/22824/A-Model-to-Represent-Directed-Acyclic-Graphs-DAG-o [retrieved on Feb. 14, 2014].
Matthias Broecheler, Social Network Data Management, 2011.
Matthias Broecheler, Using Histograms to Better Answer Queries to Probablistic Logic Programs, May 4, 2009.
Max Neunhöffer: "Graphs in data modeling?-?is the emperor naked?", Mar. 13, 2015, Retrieved from the Internet, URL: https://medium.com/@neunhoef/graphs-in-data-modeling-is-the-emperor-naked-2e65e2744413 [retrieved on Mar. 4, 2019].
Pugliese et al., Efficient Multiview Maintenance under Insertion in Huge Social Networks, Mar. 2014.
Shakarian et al., Using Generalized Annotated Programs to Solve Social Network Diffusion Optimization Problems, Jan. 2013.
Simari et al., Promises Kept, Promises Broken: An Axiomatic and Quantitative Treatment of Fulfillment, 2008.

\* cited by examiner

GRAPH DATABASE SUPER VERTEX PARTITIONING

CROSS REFERENCE TO OTHER APPLICATIONS

This application is a continuation of co-pending U.S. patent application Ser. No. 15/214,312 entitled GRAPH DATABASE SUPER VERTEX PARTITIONING filed Jul. 19, 2016 which is incorporated herein by reference for all purposes.

BACKGROUND OF THE INVENTION

In computing, a graph database uses graph structures with vertices, edges, and associated properties to represent and store data. A graph database provides index-free adjacency. Every element contains a direct pointer to its adjacent elements and no index lookups are necessary. Compared with relational databases, graph databases are often faster for associative data sets, and map more directly to the structure of object-oriented applications. As they depend less on a rigid schema, they are more suitable to manage ad hoc and changing data with evolving schemas.

However, traditional computer architecture requires data to be stored and accessed in sequential order. In order to map the multi-dimensional data of the graph data to the limited dimensionality of existing computer architecture, tradeoffs have to be made with respect to data locality and performance. Additionally, as the graph database becomes larger, it becomes inefficient and often impractical to store the database on a single storage/machine. Efficiently and effectively dividing up graph data for storage in different locations becomes important.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Graph data may be used to model pairwise relations between objects. For example, a graph includes vertices (e.g., objects) and edges (e.g., lines) connecting the vertices with relationships. An edge may be undirected (e.g., no distinction between two vertices connected by an edge) or directed from one vertex to another vertex. Properties may be associated with a vertex or an edge. For example, any number of pairwise key value pairs may be associated with a vertex or an edge as a property of the vertex/edge to identify data about the associated vertex/edge.

Figure 1A:
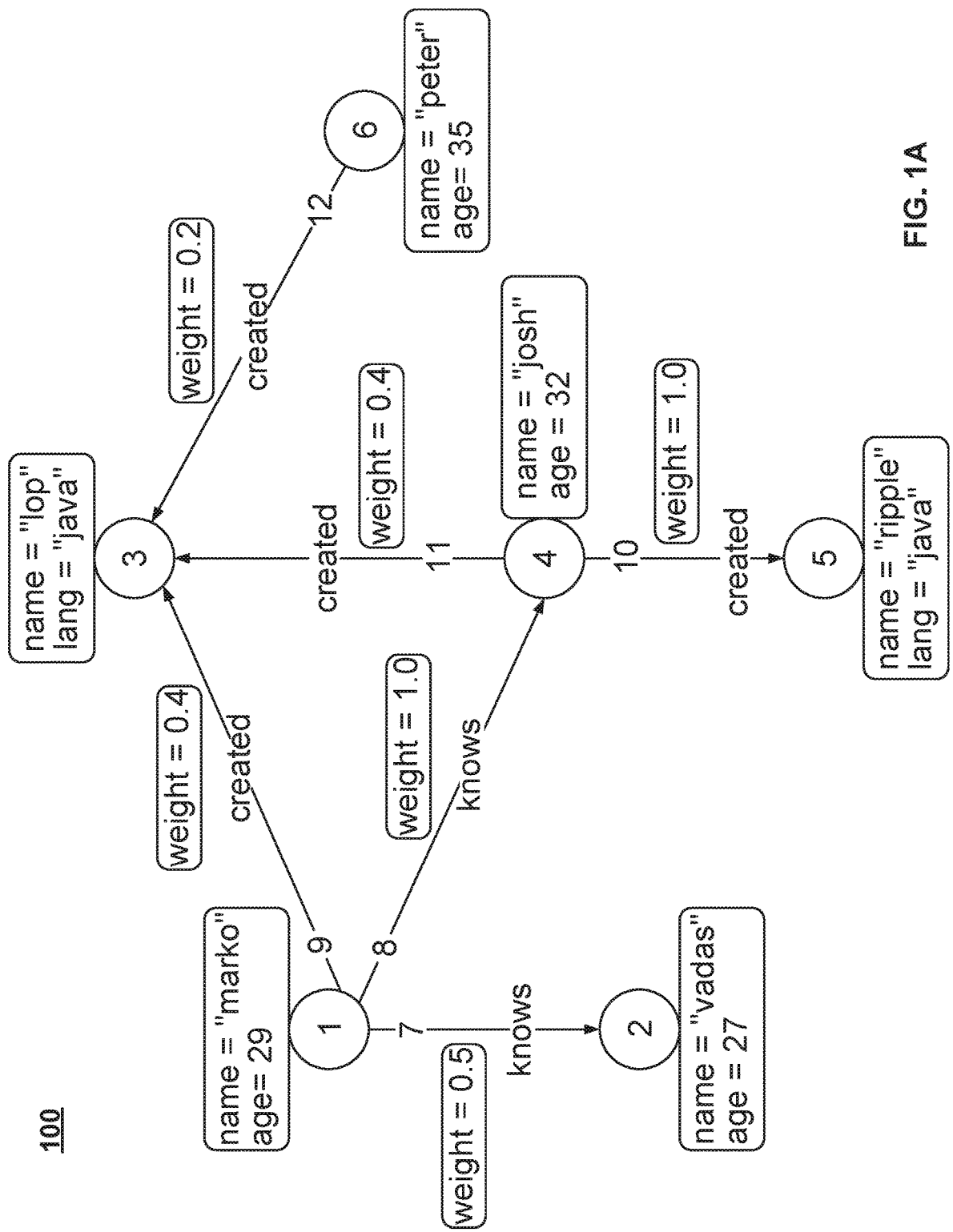
FIG. 1A is a diagram illustrating an example graph data model.
Figure 1B:
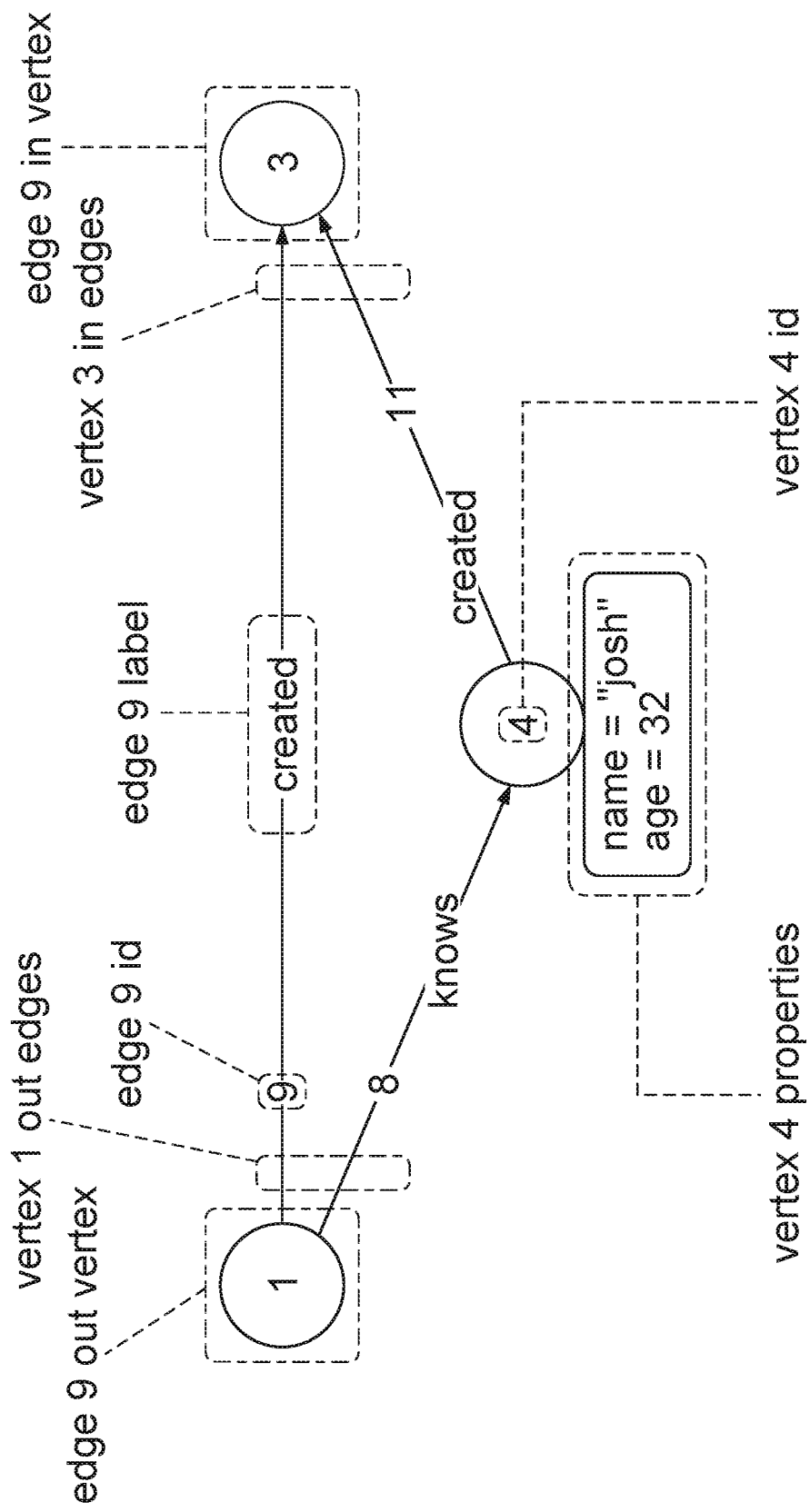
FIG. 1B is a diagram identifying a portion of graph 100 of FIG. 1A.
Figure 1C:
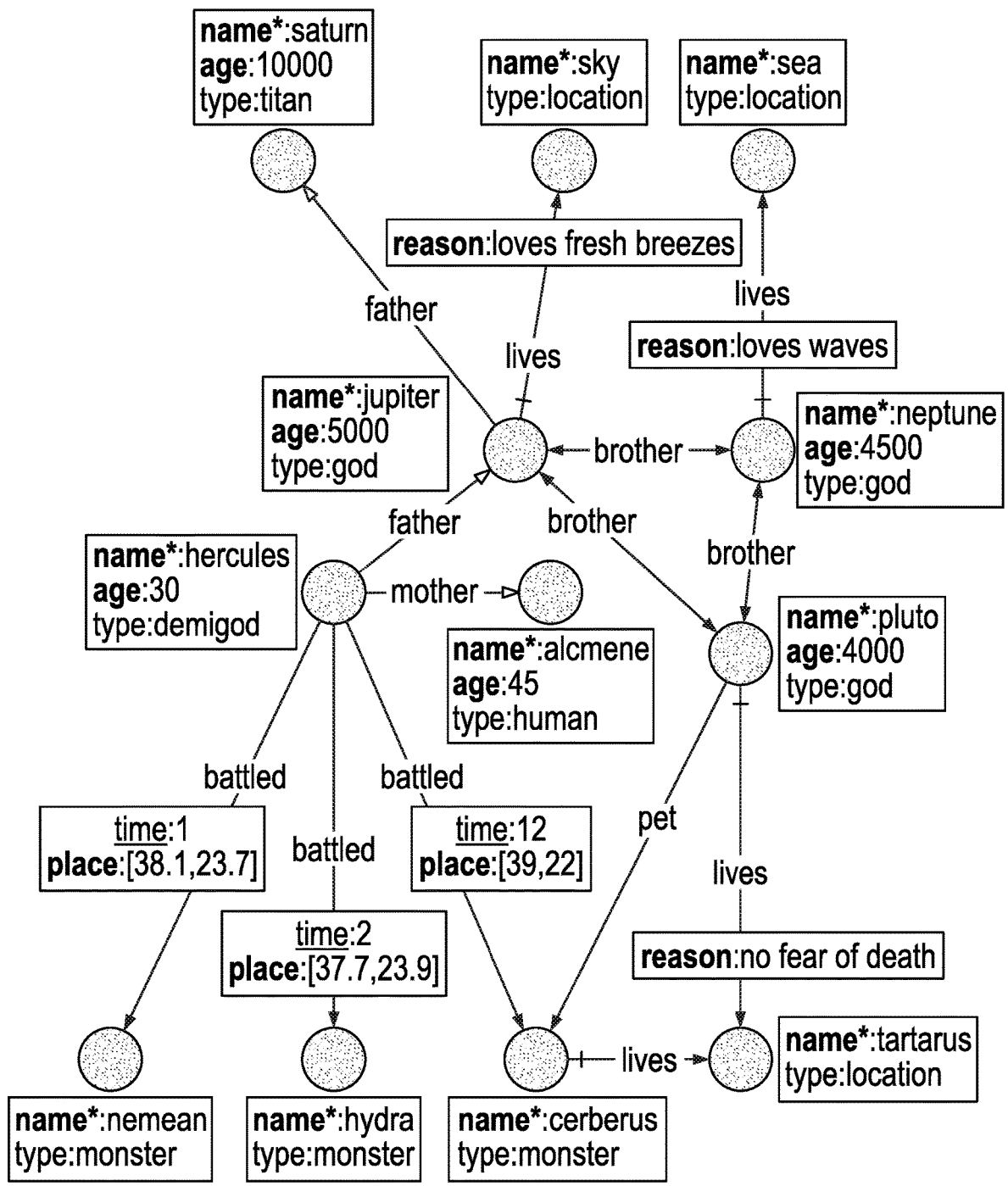
FIG. 1C is a diagram illustrating another example graph data model.

FIG. 1A is a diagram illustrating an example graph data model. FIG. 1A shows graph 100 that includes vertices and edges and associated labels, identifiers, and properties. FIG. 1B is a diagram identifying a portion of graph 100 of FIG. 1A. FIG. 1B shows graph portion 102 of graph 100 of FIG. 1A. As shown in this example graph data model, a vertex is connected to another vertex via an incoming/outgoing edge. The directed edge has a tail vertex and a head vertex. For an undirected edge, the edge connects two member vertices without a specified directionality. As shown in FIGS. 1A and 1B, each vertex may include one or more of the following elements: a label identifying the vertex, an assigned identifier that uniquely identifies the vertex, a set of one or more incoming edges, a set of one or more outgoing edges, a set of one or more undirected edges, and a set of one or more properties (e.g., key-value pairs) about the vertex. Each edge may include one or more of the following elements: a label identifying the edge, an assigned identifier that uniquely identifies the edge, an outgoing tail vertex, an incoming head vertex, a pair of undirected vertices, and a set of one or more properties (e.g., key-value pairs) about the edge. FIG. 1C is a diagram illustrating another example graph data model. The property graph model 110 describes the relationships between the beings and places of a Roman pantheon. Special text and symbol modifiers in the diagram (e.g., bold, underlined, etc.) denote different schematics/typings in the graph.

Partitioning a graph database is disclosed. In some embodiments, vertices of the graph database are each assigned to nodes (e.g., processing servers that will store data of the vertex and/or handle query processing for the vertex) according to abstract paths between the vertices. For example, abstract paths indicate relationships between vertices for purposes of graph partitioning and are different from edges connecting vertices. Each abstract path is weighted based on a likelihood of a query following/traversing the abstract path. For example, based on a specification from an administrator and/or query examples, relative frequency of common types of traversal paths of the graph database are identified. Instances of these common types of traversal paths are identified in the graph database as abstract paths and associated weights are assigned. The vertices of the graph database are assigned to nodes according to the abstract paths and their weights.

In some embodiments, one or more vertices of the graph database are designated as a super-vertex. For example, a vertex that is connected to a large number of edges and/or other vertices is a super-vertex. A vertex may be identified as a super-vertex if the number of edges and/or connected vertices is greater than a threshold value. Identifying a super-vertex may be of importance because storing and processing the super-vertex using a single node may not be possible or may be inefficient. For example, continually searching through all edges of the super-vertex to find desired data may take a long time using only a single node assigned to the super-vertex. In some embodiments, a super-vertex is split into a truncated vertex and a plurality of vertex representatives. For example, rather than storing and processing the entire super-vertex only at a single node, a portion of data for the super-vertex is separated from the main node and assigned/stored as a vertex representative for one or more other nodes. In some embodiments, edges of the super-vertex that are directed from other vertices to the super-vertex are to be separated into vertex representatives to be stored/assigned to other nodes while edges that are directed away from the super-vertex are still stored/assigned to the main node of the super-vertex.

In some embodiments, each vertex representative stored at a storage of a node includes data associated with edges of interest between other vertices assigned to the node and the super-vertex partly is represented by the vertex representative. For example, a vertex representative includes a directory of edges directed from vertices assigned to a remote node (e.g., not the main node of the super-vertex) to the super-vertex. This may allow the remote node to quickly determine all vertices of the remote node connected to the super-vertex. Additionally, when performing processing with respect to all vertices connected to the super-vertex, the processing may be distributed and processed amongst all the nodes storing the respective vertex representatives and the results of the nodes may be aggregated to determine the overall result.

Figure 2:
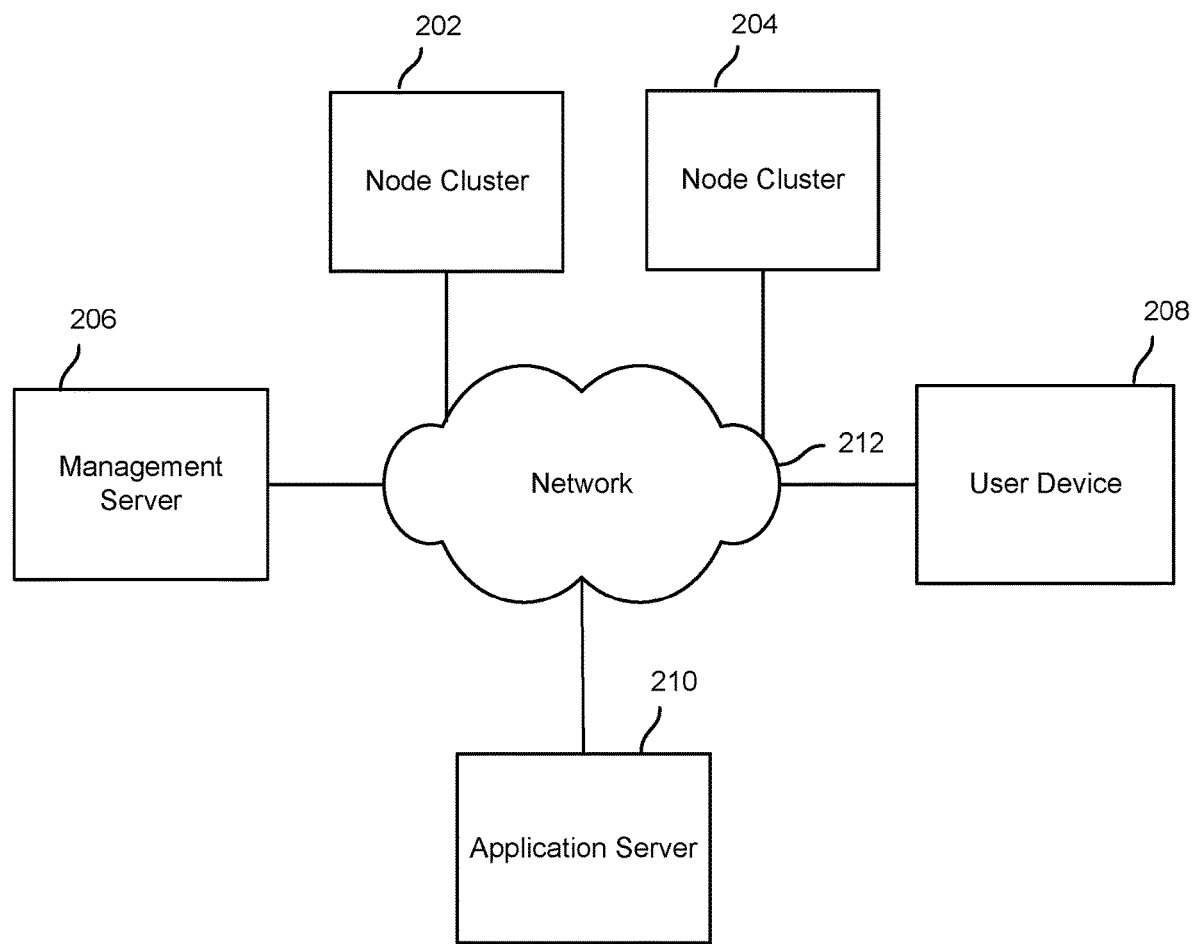
FIG. 2 is a block diagram illustrating an embodiment of a graph database deployment environment.

FIG. 2 is a block diagram illustrating an embodiment of a graph database deployment environment. Node cluster 202, node cluster 204, management server 206, user device 208, and application server 210 are connected together via network 212. User device 208 may be any computer of a user such as a laptop, a desktop, a tablet, a smartphone, a wearable device, etc. Application server 210 provides one or more applications and/or services (e.g., SaaS) to user device 208. The applications and/or services provided by application server 210 may access a node of node cluster 202 and/or a node of node cluster 204 to obtain and/or process data stored in a graph database. For example, application server 210 provides a database query to a node of a node cluster to obtain graph data desired by an application. In some embodiments, user device 208 directly accesses a node of node cluster 202 and/or a node of node cluster 204 to obtain desired graph data.

Node cluster 202 and node cluster 204 each include one or more nodes. These nodes store and/or process graph database data. Each node may include a computer/server and/or storage. Rather than storing an entire copy of the graph database on a single storage node and processing the graph database queries on a single server, the storage and processing are distributed among the nodes. Each node stores a portion of the graph database and multiple copies of the data of the graph database are distributed across a plurality of nodes to enable fault tolerance and load balancing. In some embodiments, typically a vertex is assigned to a single node. However, a vertex designated as a super-vertex is assigned to a main node of the super-vertex and a portion of data of the super-vertex relevant to other nodes is split and assigned to nodes other than the main node as a vertex representative of the super-vertex. Node cluster 202 and node cluster 204 may be physically located in different geographical regions to reduce the average physical distance between a user of the database and its closest node. In some embodiments, each node may be dynamically assigned one or more functions including real-time analytics and search processing. The division of a graph database may be optimized to enable efficient storage and/or load balancing amongst the nodes. In some embodiments, each of one or more super vertices is split amongst a plurality of nodes.

In some embodiments, node cluster 202 and/or 204 provides a graph database using a NoSQL database platform. For example, node cluster 202 and/or 204 includes Apache Cassandra nodes. By utilizing the Apache Cassandra database to store graph data, linear scalability and high fault-tolerance may be achieved. For example, data may be replicated real-time to different nodes and data centers. In some embodiments, node cluster 202 and/or 204 includes Apache Solr nodes that provide a search platform for the graph data. In some embodiments, node cluster 202 and/or 204 includes Apache Hadoop nodes. In some embodiments, node cluster 202 and/or 204 includes Apache Spark nodes for data processing. In some embodiments, node cluster 202 and/or 204 includes Apache HBase nodes that store the graph database data. In various embodiments, node cluster 202 and/or 204 includes one or more of the following types of nodes that store the graph database data: Oracle NoSQL, MongoDB, Redis, Memcached, and DynamoDB. In various embodiments, various different types of databases may be utilized to store graph data to form the graph database.

Management server 206 may allow a network administrator to monitor, configure, and manage node clusters 202 and/or 204. For example, performance metrics, errors, system status, configuration tools, automation tools, and other node cluster functions are provided via a web-based visual interface provided by management server 206.

Examples of network 212 include one or more of the following: a direct or indirect physical communication connection, a mobile communication network, a wireless network, Internet, intranet, Local Area Network, Wide Area Network, Storage Area Network, and any other form of connecting two or more systems, components, or storage devices together. Other communication paths may exist and the example of FIG. 2 has been simplified to illustrate the example clearly. Although limited instances of the components shown in FIG. 2 have been shown to simplify the diagram, additional instances of any of the components shown in FIG. 2 may exist. For example, a plurality of different client devices accesses a plurality of different application servers that utilize node clusters 202 and/or 204. Any number of node clusters may exist. Components not shown in FIG. 2 may also exist to provide a graph database.

Figure 3:
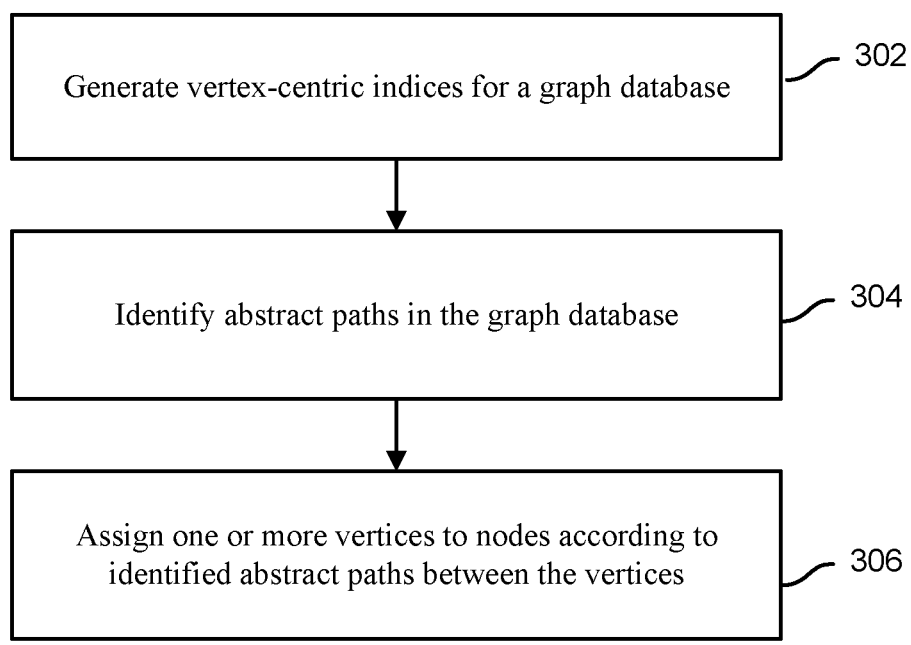
FIG. 3 is a flowchart illustrating an embodiment of a process for partitioning a graph database.

FIG. 3 is a flowchart illustrating an embodiment of a process for partitioning a graph database. The process of FIG. 3 may be implemented on one or more nodes of node cluster 202 and/or node cluster 204.

At 302, vertex-centric indices for a graph database are generated. Graph database queries are often formed from the perspective of a vertex. For example, a query may desire to identify edges of a particular vertex that match the query. In another example, a query may desire to identify an adjacent/neighbor vertex connected to the subject vertex that matches the query criteria. Rather than traversing an entire large graph of the entire dataset to locate a desired edge and/or vertex, a separate vertex-centric index for each vertex may be generated to enable fast vertex-centric query processing. Additionally, to locate a particular information about an edge or a neighbor vertex of a subject vertex, the desired information can be located with a single lookup in the vertex-centric index rather than traversing every edge/vertex of the subject vertex. In some embodiments, the vertex-centric index for a subject vertex may index data associated with at least a desired portion of one or more of the following: identifiers, labels, properties and/or directionality of edges connected to the subject vertex and identifiers, and/or properties of other vertices directly connected to the subject vertex. For example, the vertex-centric index includes a table of connected edges and adjacent vertices for a particular vertex.

In some embodiments, a vertex-centric index is specific to a vertex. Such indices are contrary to a graph index that is global to the entire graph (e.g., indexing elements for fast global lookups). In some embodiments, the purpose of vertex-centric indices is to sort and index the incident edges (and thus, adjacent vertices) of a vertex according to the incident edges' labels and properties. In large graphs, vertices may have thousands of incident edges. Traversing through those vertices can be very slow because a large subset of the incident edges has to be retrieved and then filtered in memory to match the conditions of the traversal. Vertex-centric indices can speed up such traversals by using localized index structures to retrieve only those edges that need to be traversed. Given a vertex query, these indices may be leveraged and, in doing so, linear scans of incident edges (O(n)) can be avoided and faster graph traversals ensue (O(1) or O(log n)).

In the example of graph data of FIG. 1C, suppose that "hercules" battled hundreds of monsters in addition to the three captured as shown in graph 110 of FIG. 1C. Without a vertex-centric index, a query asking for those monsters battled between time point "10" and "20" would require retrieving all "battled" edges even though there are only a handful of matching edges. Building a vertex-centric index by time may speed up such traversal queries.

Using the Titan Graph Database of DataStax of Santa Clara, Calif., the following code may be utilized to build a vertex-centric index, which indexes "battled" edges in both directions by time in decreasing order:

```
mgmt=g.getManagementSystem( )

time=mgmt.makePropertyKey('time').dataType(Integer.class).make( )

battled=mgmt.makeEdgeLabel('battled').make( )

mgmt.buildEdgeIndex(battled,'battlesByTime',Direction.BOTH,Order.DESC,time);
```

In this example code, a vertex-centric index is built against a particular edge label which is the first argument to the index construction method TitanManagement.buildEdgeIndex( ). The index only applies to edges of this label—battled in the example above. The second argument is a unique name for the index. The third argument is the edge direction in which the index is built. The index will only apply to traversals along edges in this direction. In this example, the vertex-centric index is built in both directions which means that time restricted traversals along "battled" edges can be served by this index in both the "IN" and "OUT" directions. Titan will maintain a vertex-centric index on both the in- and out-vertex of "battled" edges. Alternatively, one could define the index to apply to the "OUT" direction only which would speed up traversals from "hercules" to the monsters but not in the reverse direction. This may only require maintaining one index and hence result in half the index maintenance and storage cost. The last two arguments are the sort order of the index and a list of property keys to index by. The sort order is optional and defaults to ascending order (e.g., "Order.ASC"). The list of property keys must be non-empty and defines the keys by which to index the edges of the given label. A vertex-centric index may be defined with multiple keys.

The following example extends the schema by a "rating" property on "battled" edges and builds a vertex-centric index which indexes "battled" edges in the out-going direction by rating and time in decreasing order. The order in which the property keys are specified may be of importance because vertex-centric indices are prefix indices—"battled" edges are indexed by "rating" first and "time" second.

```
mgmt=g.getManagementSystem( )

time=mgmt.makePropertyKey('time').dataType(Integer.class).make( )

rating=mgmt.makePropertyKey('rating').dataType
    (Decimal.class).make( )

battled=mgmt.makeEdgeLabel('battled').make( )

mgmt.buildEdgeIndex(battled,'battlesByRatingAndTime',Direction.OUT,Order.DE SC,rating,time);
```

For the following queries, the "battlesByRatingAndTime" index can speed up the first two but not the third query.

```
h.outE('battled').has('rating',gt(3.0)).inV( )

h.outE('battled').has('rating',5.0).has('time',inside
    (10,50)).inV( )

h.outE('battled').has('time',inside(10,50)).inV( )
```

In some embodiments, multiple vertex-centric indices are built for the same edge label in order to support different constraint traversals. In some embodiments, a graph database query optimizer attempts to pick the most efficient index for any given traversal.

At 304, abstract paths in the graph database are identified. For example, an abstract path identifies a strength of a relationship (e.g., likelihood of traversal/following of path in a query) between at least two vertices to assist in determining whether the vertices connected by the abstract path should be assigned to the same node. In an example, a strong relationship (e.g., higher weight value) would indicate that the vertices of the abstract path should not be separated into different nodes, if possible, and a weak or no relationship would indicate less importance on keeping the vertices together. In some embodiments, identifying the abstract paths includes identifying a measure of likelihood (e.g., abstract path weight value) that vertices connected by the abstracts paths will be accessed together in a database query. By using this measure, vertices that are likely to be accessed together can be identified and assigned to the same node.

Identification and creation of an abstract path between two or more vertices does not necessarily mean there is an edge connection between the vertices. For example, an abstract path between vertices may be established even though there is no direct edge between the vertices because a shortcut traversal exists between the vertices. In another example, an edge connection exists between vertices but an abstract path has not been established between them because the edge is not likely to be traversed. In some embodiments, by connecting vertices through abstract paths that are each weighed according to the likelihood of traversal between the vertices connected by the abstract path in a database query, a map of relationship strengths between vertices is created and vertices that are likely to be accessed together can be identified and assigned to the same node using the map.

However, it can be difficult to determine the exact measure of likelihood that two vertices will be accessed together in queries before the queries are performed. Thus it becomes important to determine the best approximation for the measure of likelihood that two vertices will be accessed together in future queries.

In some embodiments, identifying the abstract paths includes identifying one or more templates for the abstract paths. For example, using a history of previous graph database queries, patterns in common types of graph traversals required to process the queries are identified. In some embodiments, a specification of the templates for the abstract paths is received from an administrator. For example, a database administrator is aware of the common types of graph database traversals and specifies the description and/or the templates as well as associated weights of the templates. Each template may specify one or more identifiers, labels, properties, and/or directionality of vertices and/or edges to be matched and an associated weight to be assigned to a matching path. The templates may be applied to the graph database to identify all paths in the graph database that match the templates as the abstract paths with the corresponding weights.

In some embodiments, identifying the abstract paths includes identifying abstract paths for an existing graph dataset. In some embodiments, identifying the abstract paths includes identifying any new abstract paths that would be created due to adding a new vertex to the database.

Figure 1D:
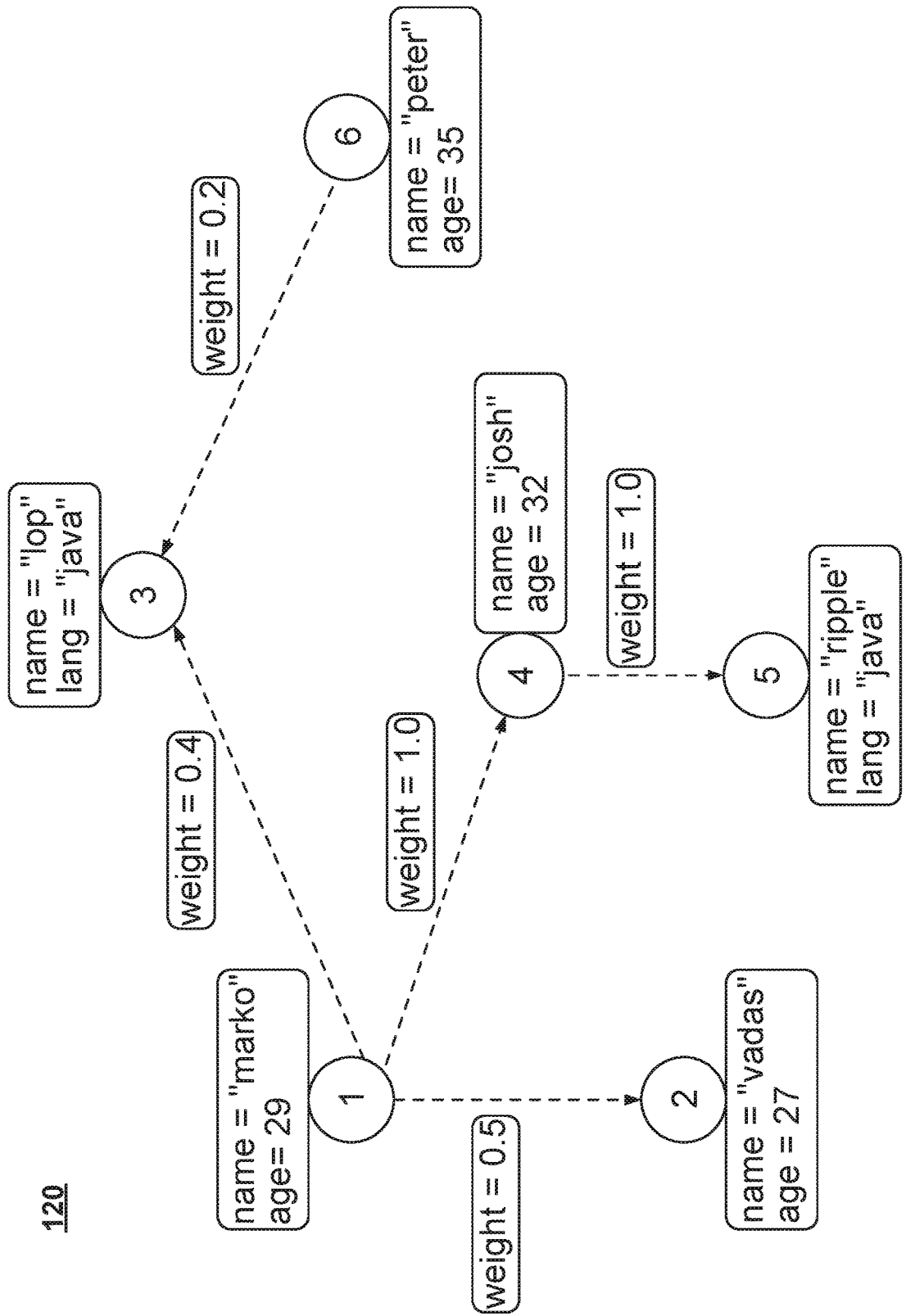
FIG. 1D is a diagram illustrating an example graph 120 showing abstract paths and associated weight values that have been identified for graph 100 shown in FIG. 1A.

FIG. 1D is a diagram illustrating an example graph 120 showing abstract paths and associated weight values that have been identified for graph 100 shown in FIG. 1A.

Returning to FIG. 3, at 306, one or more vertices are assigned to nodes according to identified abstract paths between the vertices. In some embodiments, the identified abstract paths that are utilized to assign vertices are a subset of all abstract paths that have been identified for the graph database. For example, only recently identified abstract paths (e.g., abstract paths identified within a specified time period) are eligible to be utilized in assigning the vertices to the nodes.

In some embodiments, assigning the vertices includes deciding to redistribute/reassign the vertices of the database by dividing the database amongst nodes based on the identified abstract paths. In some embodiments, it was decided that the database is to be divided due to one or more performance metrics of the database. For example, when it is detected that a database query processing time of a node is above a threshold, the redistribution of the database is initiated to more evenly distribute workload amongst available nodes. In some embodiments, the database is redistributed amongst nodes periodically. For example, over time, data access patterns may change and/or vertex assignments may become imbalanced and the vertices are periodically redistributed amongst nodes to more equally distribute vertices/workloads.

In some embodiments, the number of nodes to be utilized is specified and/or predetermined. For example, one additional node is to be added incrementally. In some embodiments, the number of nodes to be utilized is dynamically determined based on a size of the database and/or a performance metric of the database. For example, the number of nodes to be added is calculated to be the number of nodes required to achieve a desired performance characteristic and/or distribution. In some embodiments, dividing the database includes determining an assignment of the vertices to the nodes such that the sum of weights of abstract paths spanning between vertices that are assigned to different nodes are minimized. For example, each node is to be assigned a minimum number/percentage of vertices and/or up to a maximum number/percentage of vertices and within these minimum/maximum guidelines, the vertices are assigned such that the sum of all weights of abstract paths that span between vertices assigned to different nodes is minimized. Once a vertex is assigned to a node, the data of the vertex (e.g., vertex centric index) is stored at a storage of the node and the vertex is to be accessed by the node when the vertex is retrieved, modified, and/or traversed. In some embodiments, dividing the database includes determining an assignment of the vertices to the nodes such that the sum of weights of abstract paths between vertices assigned to the same node are maximized. In some embodiments, dividing the database includes determining an assignment of the vertices to the nodes such that the sum of weights of abstract paths between vertices assigned to the same node are similar (e.g., within a range) across all the nodes to be utilized while minimizing weights of abstract paths that span between vertices assigned to different nodes.

In some embodiments, assigning the one or more vertices includes assigning a new vertex to be added to one of the nodes based on the abstract paths of the graph database. For example, when a new vertex is to be added, the new vertex is to be assigned to the node that will likely result in the best database performance. If the new vertex is assigned inefficiently to the wrong node, it may cause performance inefficiencies arising from database queries associated with the new vertex that span across multiple nodes instead of being able to be handled by a single node. In some embodiments, assigning the new vertex includes assigning the new vertex to a node such that the sum of weights of abstract paths of the new vertex that span across different nodes is minimized and/or the sum of weights of abstract paths of the new vertex that span within the same node is maximized. For example, once all the new abstract paths resulting from adding the new vertex are identified, each node assignment option is iterated until the node assignment that results in the smallest weight sum of abstract paths spanning across nodes is identified. In various embodiments, other factors may be considered when assigning the new vertex to a node. For example, the new vertex is assigned to a probabilistically selected node based at least in part on abstract paths of the graph database in an attempt to more evenly distribute vertices across nodes.

Figure 4:
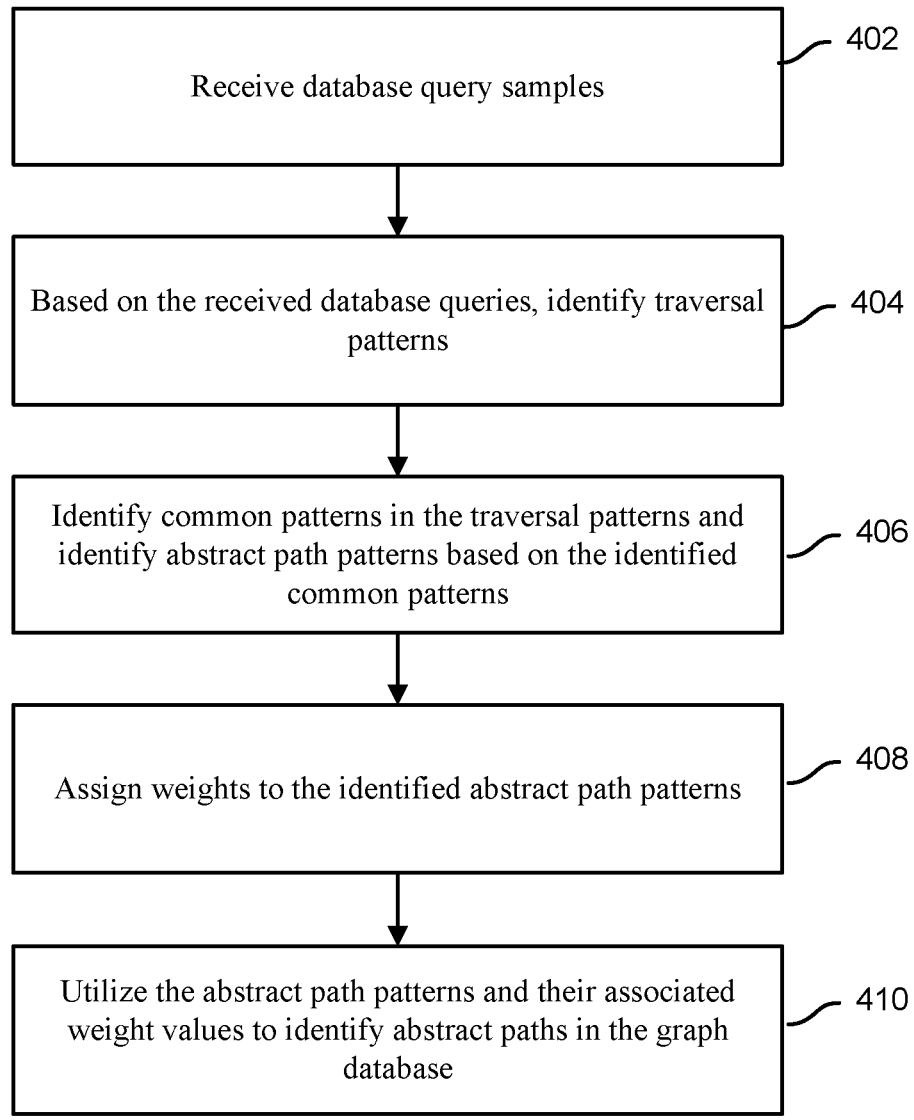
FIG. 4 is a flowchart illustrating an embodiment of a process for applying an identified abstract path pattern to a graph database.

FIG. 4 is a flowchart illustrating an embodiment of a process for applying an identified abstract path pattern to a graph database. The process of FIG. 4 may be implemented on one or more nodes of node cluster 202 and/or node cluster 204. In some embodiments, the process of FIG. 4 is included in 304 of FIG. 3.

At 402, database query samples are received. In some embodiments, the received database queries are example database queries received via a database administrator. For example, a list of example queries that would be typical queries for the graph database has been specified by the administrator. In another example, previous database queries from a similar database (e.g., queries received by another graph database of a similar type) are received. In some embodiments, the received database queries are previous database queries of the graph database. For example, previous queries that have been processed using the graph database are to be utilized to identify abstract path patterns for the graph database. As new queries of the graph database are processed, new abstract path patterns may be continually/periodically identified using the new queries. In some embodiments, the received database query samples to be utilized to identify abstract path patterns are constrained to be only recent database queries. For example, only database queries processed within a specified time period are eligible to be utilized for processing to identify abstract path patterns.

At 404, based on the received database queries, traversal patterns are identified. For example, the database queries have been formed with respect to a specific vertex and/or edge and in order to extract commonalities between database queries, the underlying traversal patterns of the database queries are determined. For example, the type and/or properties of vertices and/or edges queried and/or required to be traversed to process the database query are extracted without specific vertex or edge identifiers. By extracting generalized aspects of a database query that describe the types of vertex traversals required to process the query, commonality between the extracted patterns may be formed as templates to identify likely future vertex traversals. In some embodiments, each received database query is processed to identify one or more properties of a starting vertex, a target vertex, an intermediary vertex, and/or edge(s) obtained/traversed to process the database query in determining a generalized traversal pattern for each database query.

At 406, common patterns in the traversal patterns are identified and abstract path patterns are identified based on the identified common patterns. In some embodiments, identifying common patterns includes identifying commonality in any portion of or entire traversal patterns. For example, given a list of traversal patterns, the patterns are sorted, organized, split, and/or analyzed to identify aspects of components of the patterns. In one example, if a traversal pattern identifies a traversal between several vertices, each combination of traversal components is extracted as a sub pattern and identified.

In some embodiments, a list of unique patterns and the number of times each pattern has been detected in the identified traversal patterns are determined. One or more of these patterns may be selected to become an abstract path pattern to be utilized to identify similar paths in the graph database. Each abstract path pattern may identify one or more properties, directionality, etc. of one or more vertices and/or edges that identify its corresponding abstract path. An abstract path pattern may correspond to a detected traversal path that was detected as a full path or a sub path required to be traversed to process a search query.

At 408, weights are assigned to the identified abstract path patterns. In some embodiments, the weight values correspond to how common and/or the number of times the traversal path of the abstract path pattern was detected in the received database queries. For example, a higher assigned weight value corresponds to an abstract path pattern that describes a common traversal path while a lower assigned weight value corresponds to an abstract path pattern that describes a less common traversal path.

A 410, the abstract path patterns and their associated weight values are utilized to identify abstract paths in the graph database. Identifying the abstract paths includes identifying paths between two or more vertices in the graph database that match criteria of any of the abstract path patterns and the matched paths are identified as abstract paths and assigned weights corresponding to the weight value of the matched abstract path pattern.

Figure 5:
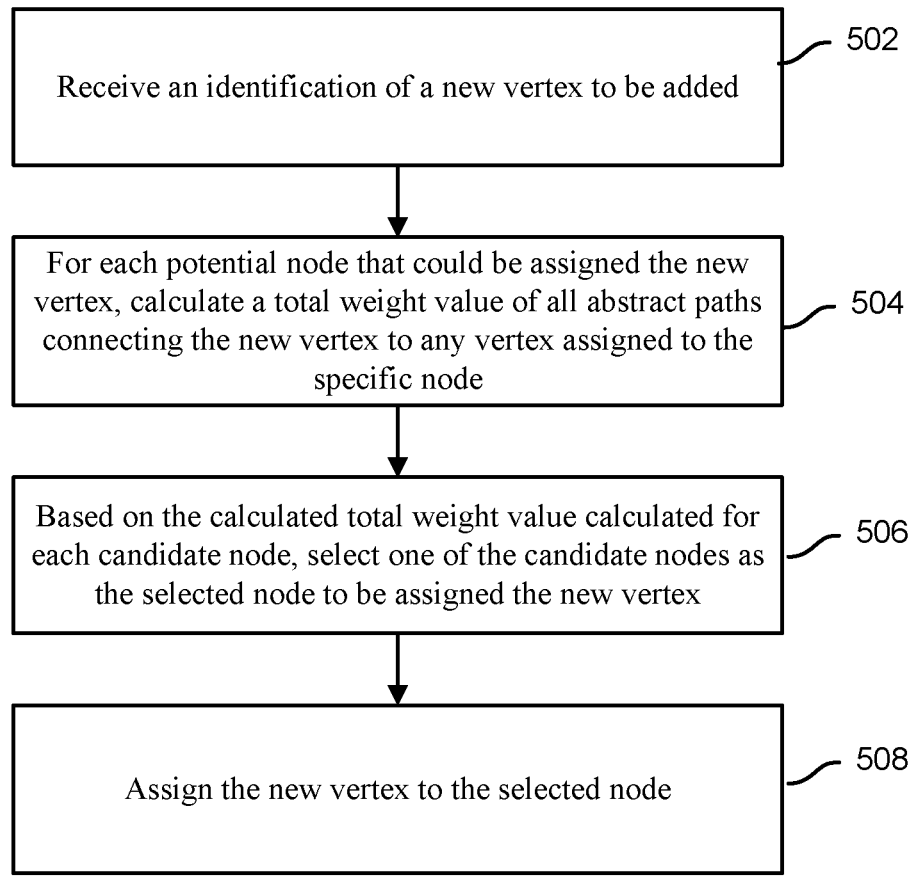
FIG. 5 is a flowchart illustrating an embodiment of a process for adding a new vertex to a graph database.

FIG. 5 is a flowchart illustrating an embodiment of a process for adding a new vertex to a graph database. The process of FIG. 5 may be implemented on one or more nodes of node cluster 202 and/or node cluster 204. In some embodiments, the process of FIG. 5 is included in 306 of FIG. 3.

At 502, an identification of a new vertex to be added is received. In some embodiments, the identification specifies an identifier of the vertex. In some embodiments, the identification identifies one or more identifiers, labels, properties, and/or directionality of vertices and/or edges connected to the new vertex to be added. In some embodiments, the identification specifies a vertex-centric index of the new vertex to be added.

At 504, for each potential node that could be assigned the new vertex, a total weight value of all abstract paths connecting the new vertex to any vertex assigned to the specific node is calculated. For example, any new abstract path matching the new vertex is identified and for each potential node among a plurality of nodes that the new node can be assigned to, values of the weights of any new abstract path connecting the new vertex to another vertex assigned to the same node are summed. The new abstract paths may be identified by identifying any new abstract path that matches one or more abstract path templates (e.g., templates determined using the process of FIG. 4) due to the inclusion of the new vertex to the graph database. These new abstract paths will connect the new vertex to one or more other vertices and if the connected other vertex of a new abstract path is included in the same candidate node, the weight value of the new abstract path is to be summed together to determine a total weight value of all abstract paths contributed by the new vertex for being assigned to the candidate node.

At 506, based on the calculated total weight value calculated for each candidate node, one of the candidate nodes is selected as the selected node to be assigned the new vertex. In some embodiments, selecting the selected node includes selecting the node that is associated with the total weight value that indicates the strongest relationship with the new vertex. For example, the candidate node associated with the largest calculated total weight value is selected as the selected node. In another example, the candidate node assignment that results in the smallest combined calculated total weight value of other candidate nodes is selected as the selected node.

In some cases, by selecting the node with the strongest relationship (e.g., highest weight total) every time a new vertex is to be assigned, it may cause vertex distribution between nodes to become uneven as new vertex assignments gravitate towards the node with the largest number of vertex assignments.

In some embodiments, a randomization factor is introduced in selecting the selected node to at least in part probabilistically/randomly select the selected node based on the calculated total weight values. In some embodiments, rather than simply selecting the node with the highest weight value, the selected node is randomly selected based on probabilities and the calculated total weight values for each candidate node correspond to a probability that the candidate node will be selected as the selected node. For example, the total sum of all calculated weight values for all the candidate nodes is determined and utilized as the denominator for the probability of each candidate node being selected. Thus in this example, the probability of a candidate node being selected is given by the calculated total weight value for the node divided by this total sum of all calculated weight values. In some embodiments, a range of numbers is divided into groups corresponding to each different candidate node and the amount of the range portion corresponding to a candidate node corresponds to the relative amount of the calculated total weight value of the candidate node as compared to the calculated weight values of the other candidate nodes and the candidate node that corresponds to a randomly selected value within the range of numbers is selected as the selected node.

In some embodiments, selecting the selected node includes dynamically determining a dampening factor that influences a degree/amount of randomness in selecting the selected node. For example, on one extreme the selected node is deterministically selected based on which candidate node is associated with the best calculated total weight value while on the other extreme the selected node is randomly selected amongst all of the candidate nodes with all of the candidate nodes having equal chance of being selected, and the dampening factor specifies the degree to which the randomness/probability is an influence on the selection of the selected node. This may be achieved by allowing the dampening factor to adjust the selection probabilities of the candidate nodes. For example, a selection probability of a candidate node is the dampening factor multiplied by its probability value (e.g., calculated total weight value of the node divided by the total sum of all total weight values of all candidate nodes). This may allow the selection probability of a node to be dynamically adjusted based on various factors. In various embodiments, the dampening factor is dynamically adjusted based on performance metrics of one or more nodes, the variance in vertex assignments between available nodes, total number of assigned vertices of one or more nodes, and/or capacity level of one or more nodes.

Figure 1E:
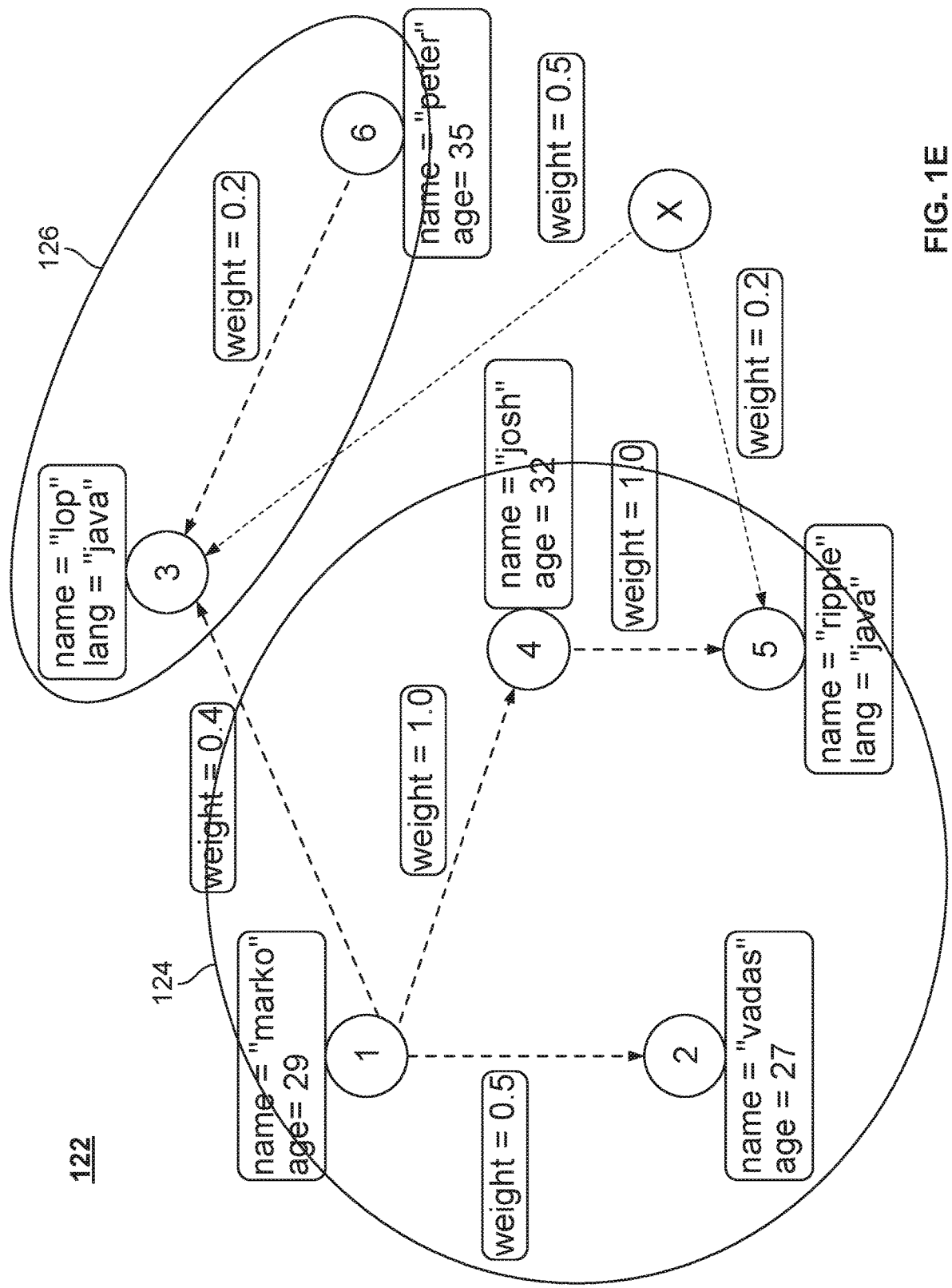
FIG. 1E is a diagram illustrating an example of adding a new vertex. Graph 122 shows a graph that has been distributed among two nodes.

FIG. 1E is a diagram illustrating an example of adding a new vertex. Graph 122 shows a graph that has been distributed among two nodes. Circle 124 includes vertices assigned to a first node and circle 126 includes vertices assigned to a second node. The abstract path with weight=0.4 spans between the two nodes. When vertex "x" of graph 122 is to be added, it needs to be determined whether the vertex "x" should be added to the node of circle 124 or the node of circle 126. When vertex "x" is added to the graph, two new abstract paths can be identified. The first new abstract path connects vertex "x" to vertex "3" with weight=0.5 and the second new abstract path connects vertex "x" to vertex "5" with weight=0.2. In some embodiments, it is determined to assign vertex "x" the node of circle 126 because the total weight of abstract paths between vertex "x" and vertices of the node is the greatest (e.g., 0.5 compared to 0.2). In some embodiments, it is determined to assign vertex "x" the node of circle 124 because the total weight of abstract paths that span between vertex "x" and vertices of the node is the lowest (e.g., 0.2 as compared to 0.5). In some embodiments, vertex "x" is assigned to a node probabilistically and a chance that vertex "x" will be assigned to the node of circle 124 is 0.2/(0.2+0.5)=28.57% and a chance that vertex "x" will be assigned to the node of circle 126 is 0.5/(0.2+0.5)=71.43%. In some embodiments, vertex "x" is assigned to a node randomly and there is an equal chance that vertex "x" will be assigned to the node of circle 124 or circle 126. In some embodiments, vertex "x" is assigned to the node of circle 124 because the abstract path connecting vertex "x" to vertex "3" was randomly selected to be assigned a weight value of zero using at least a portion of the process of FIG. 6.

Returning to FIG. 5, at 508, the new vertex is assigned to the selected node. In some embodiments, assigning the new vertex includes storing data of the new vertex in a storage of the selected node. In some embodiments, the assigning the selected node includes assigning query processing associated with the selected node (e.g., traversal) to be handled by the selected node.

Figure 6:
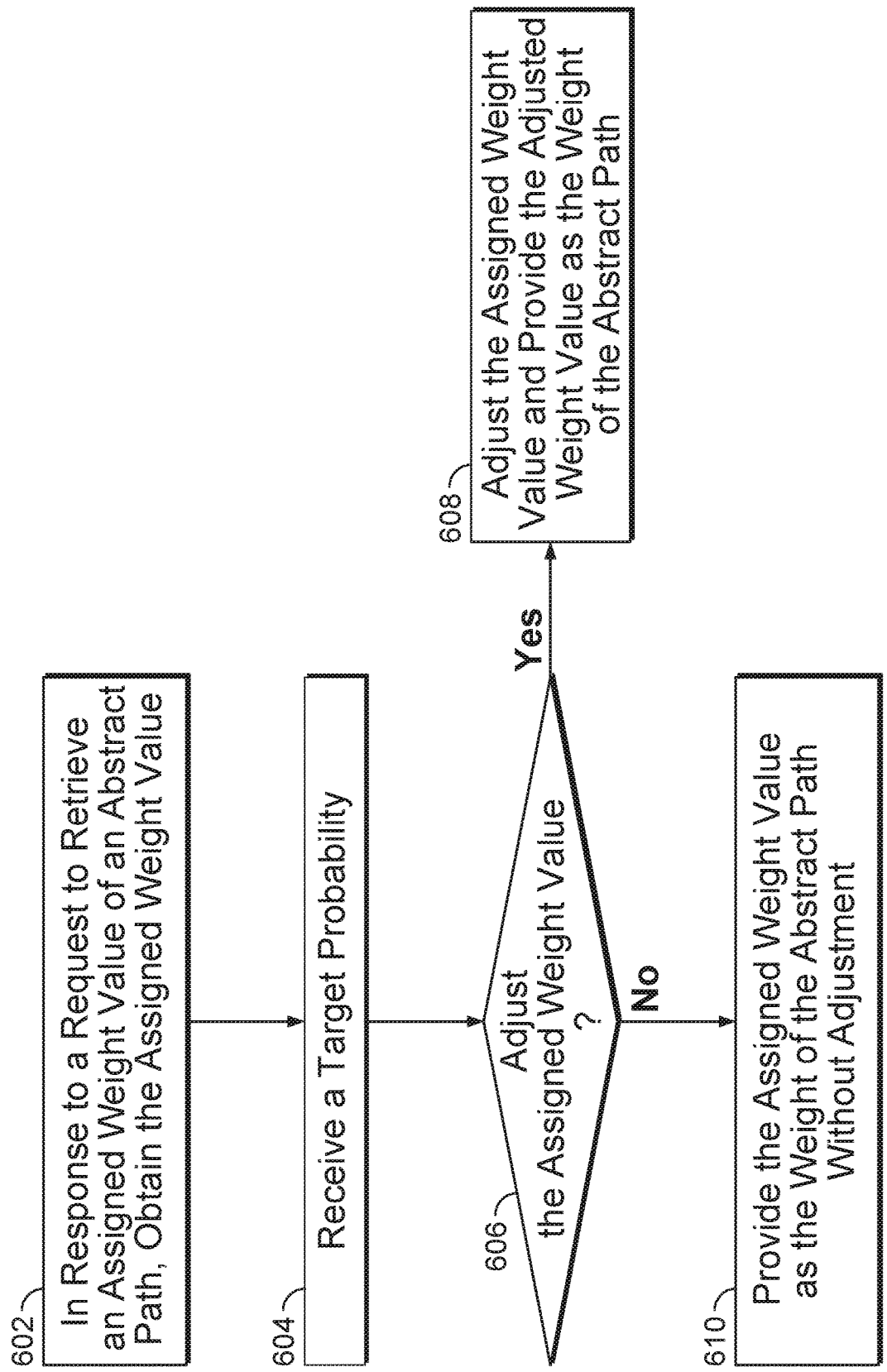
FIG. 6 is a flowchart illustrating an embodiment of a process for determining a weight value of an abstract path to be used to determine graph partitioning.

FIG. 6 is a flowchart illustrating an embodiment of a process for determining a weight value of an abstract path to be used to determine graph partitioning. The process of FIG. 6 may be implemented on one or more nodes of node cluster 202 and/or node cluster 204. In some embodiments, at least a portion of the process of FIG. 6 may be executed in the processes of FIG. 3, 4 or 5 when a weight assigned to an abstract path is to be retrieved for use. For example, the weight value assigned to an abstract path may need to be determined to partition a graph database, sum weight values, determine lowest weight value, etc.

At 602, in response to a request to retrieve an assigned weight value of an abstract path, the assigned weight value is obtained. For example, every abstract path has been assigned a weight value corresponding to how likely the path is traversed when processing a query and the preassigned weight value of the path is obtained. However, rather than return the retrieved assigned weight value, for certain cases, the weight value is randomly altered to introduce a randomness factor to allow more even distribution of vertices amongst available nodes. For example, if the assigned weight value was utilized, it may lead to uneven distribution of vertices among the available nodes because the node assignments tend to converge at a single node. By randomly severing or deemphasizing abstract paths between certain vertices, vertices may become more evenly distributed amongst all the eligible nodes.

At 604, a target probability is received. In some embodiments, the target probability specifies the probability that the assigned weight value should be adjusted. For example, for 10% of times a weight value is requested, the assigned weight value is to be adjusted before use in assigning a vertex to a node. This probability may be adjusted based on performance metrics of one or more nodes, the variance in vertex assignments between available nodes, total number of assigned vertices of one or more nodes, and/or capacity level of one or more nodes.

At 606, based on the target probability, it is probabilistically determined whether to adjust the assigned weight value. For example, whether to adjust the assigned weight value is probabilistically determined based on the target probability. In some embodiments, a random value is determined and the random value maps to a probabilistic decision on whether to adjust the assigned weight value.

If at 606 it is determined that the assigned weight value is to be adjusted, at 608 the assigned weight value is adjusted and provided as the weight of the abstract path. In some embodiments, adjusting the weight value includes setting the weight value to zero (e.g., to indicate abstract path is not to be utilized). In some embodiments, adjusting the weight value includes multiplying the weight value by an adjustment factor. The adjustment factor may be preset or dynamically determined (dynamic based on performance metrics of one or more nodes, the variance in vertex assignments between available nodes, total number of assigned vertices of one or more nodes, and/or capacity level of one or more nodes, etc.).

If at 606 it is determined that the assigned weight value is not to be adjusted, at 610 the assigned weight value is provided as the weight of the abstract path without adjustment.

Figure 7:
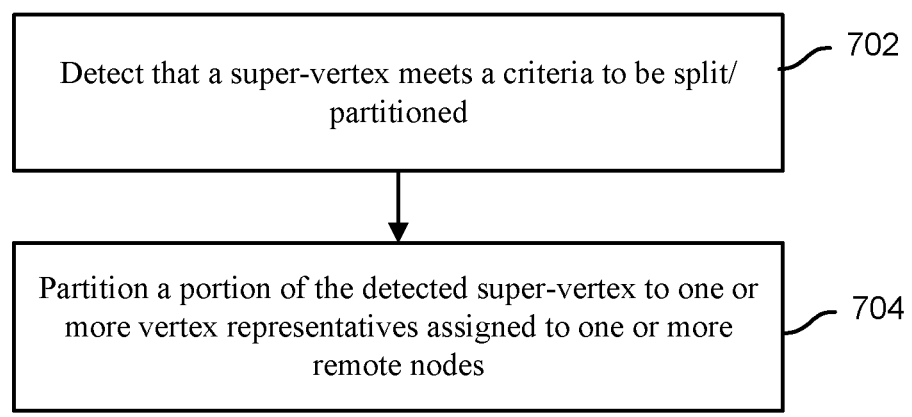
FIG. 7 is a flowchart illustrating an embodiment of a process for splitting a super-vertex.

FIG. 7 is a flowchart illustrating an embodiment of a process for splitting a super-vertex. The process of FIG. 7 may be implemented on one or more nodes of node cluster 202 and/or node cluster 204. In some embodiments, database performance may become hindered due to a super-vertex that is connected to a large number of other vertices. For example, because a single node is typically tasked with processing requests associated with its assigned vertices, the node may become a bottleneck as traversal of the super-vertex increases. By splitting at least a portion of the super-vertex and assigning a representative portion of the super-vertex to other nodes, the processing associated with the super-vertex becomes distributed.

At 702, it is detected that a super-vertex meets a criteria to be split/partitioned. In some embodiments, a super-vertex is a vertex that is eligible to be split. In some embodiments, a vertex has been designated as a super-vertex. For example, vertices with certain properties are known to be likely to be connected to a large number of other vertices and are indicated by an administrator and/or user to be a super-vertex. In some embodiments, the super-vertex is automatically designated. For example, vertices with one or more properties that match one or more specified criteria are automatically designated as super-vertices. In one example, a vertex that is connected to at least a specified minimum number of other vertices and/or edges is automatically designated as a super-vertex. Many vertices of a graph database may be designated as a super-vertex.

In some embodiments, super-vertices are monitored to identify whether any of them are to be split. For example, super-vertices are periodically analyzed to identify whether the number of connected vertices and/or edges exceeds a threshold value. In some embodiments, detecting that the super-vertex meets the criteria includes detecting that one or more properties of the super-vertex meets the criteria. For example, only certain types of edges/connections to certain vertices are to be split from the super-vertex and it is detected that the super-vertex meets the criteria if the number of the certain types of edges/connections to certain vertices exceeds a threshold value. The criteria may have been preconfigured and/or specified by an administrator/user.

At 704, a portion of the detected super-vertex is partitioned to one or more vertex representatives assigned to one or more remote nodes. In some embodiments, a super-vertex is partitioned into a truncated vertex and one or more vertex representatives. For example, rather than storing and processing the entire super-vertex at a single node, a portion of data for the super-vertex is separated from the main node storing the super-vertex and stored as one or more vertex representatives in one or more other remote nodes (e.g., nodes that are not the main node). By only selectively splitting a targeted portion of the data (e.g., edge and connected vertex data based on directionality and/or labels) of the super-vertex, the relevant portions may be split without the need to incur overhead penalties of splitting non-targeted portions. For example, the portion of the super-vertex (e.g., incoming edges) that is split may be edges of the super-vertex that are directed from other vertices to the super-vertex while the portion of the super-vertex that is not split and retains the truncated vertex of the main node is edges of the super-vertex that are directed from the super-vertex to other connected vertices (e.g., outgoing edges). The portion of the super-vertex that is not split is stored and maintained as the truncated vertex by the main node that was assigned to the super-vertex while the portion that is split away from the super-vertex is to be separated into vertex representatives to be stored remotely in other remote nodes. In some embodiments, splitting the portion includes removing the portion from the storage of the main node assigned to the super-vertex and storing at least some of the portion in storage of relevant remote node(s) as a vertex representative(s). For example, the vertex-centric index of the super-vertex is modified to move data and/or properties of one or more edges and/or connected vertices to one or more remote nodes.

Each vertex representative stored at a remote node includes data identifying at least a portion of connections (e.g., identifiers, labels, properties, and/or directionality of edges/vertices, etc.) of the super-vertex such that for at least some traversals, the super-vertex can be traversed by the remote node without needing to access the main node of the super-vertex. However, for other traversals of the super-vertex not able to be satisfied, the main node or another remote node may need to be accessed.

Each vertex representative of each different remote node is different and stores data of the super-vertex with respect to its remote node. For example, a vertex representative includes data of a portion of edges connected to the super-vertex. These remote node-specific vertex representatives are stored and maintained by the respective remote nodes. Thus using the vertex representative, the remote node is able to quickly identify which nodes assigned to the remote node are connected to the super-vertex without the need to request the main node of the super-vertex. The properties associated with these edges and/or connected vertices may also be stored in the vertex representative.

In some embodiments, the truncated vertex tracks which remote nodes are storing the split portion of the super-vertex. For example, the truncated vertex includes one or more identifiers of one or more remote nodes that are storing the split portion and in the event the main node is no longer storing the split portion that is to be accessed to process a database request, the main node is able to identify the remote node that is storing the split portion to complete the database request.

In some embodiments, each vertex representative is identified by an identifier that identifies that it is a vertex representative of the vertex data stored at the main node. For example, using an identifier (e.g., root address) of the super-vertex, each remote node is able to identify any vertex representative stored and managed by the remote vertex. The main node assigned to the truncated vertex is still the main authority of the data and processing associated with the super-vertex. However, the vertex representatives assigned to remote vertices are tasked with maintaining and processing database requests associated with data of its vertex representative of the super-vertex. For example, a database request to identify all vertices connected with edges directed from the super-vertex to other vertices is processed by the main node that is assigned to the truncated vertex while a database request to obtain an edge directed from a specific vertex to the super-vertex is to be processed by a remote node assigned to the vertex representative storing the relevant data. Thus the query routing is made efficient by having the vertex representatives store the edge data connecting to those vertices that are stored on the same node as the vertex representative.

In some embodiments, at least a portion of data of the super-vertex is duplicated between the truncated vertex and one or more vertex representatives. For example, one or more select identifiers, labels, and/or properties of the super-vertex may be stored and maintained at both the truncated vertex and one or more vertex representatives. In some embodiments, when a vertex connected to the super-vertex is added or removed from a node assigned to a vertex representative of the super-vertex, the vertex representative is automatically updated to reflect the change.

Figure 8:
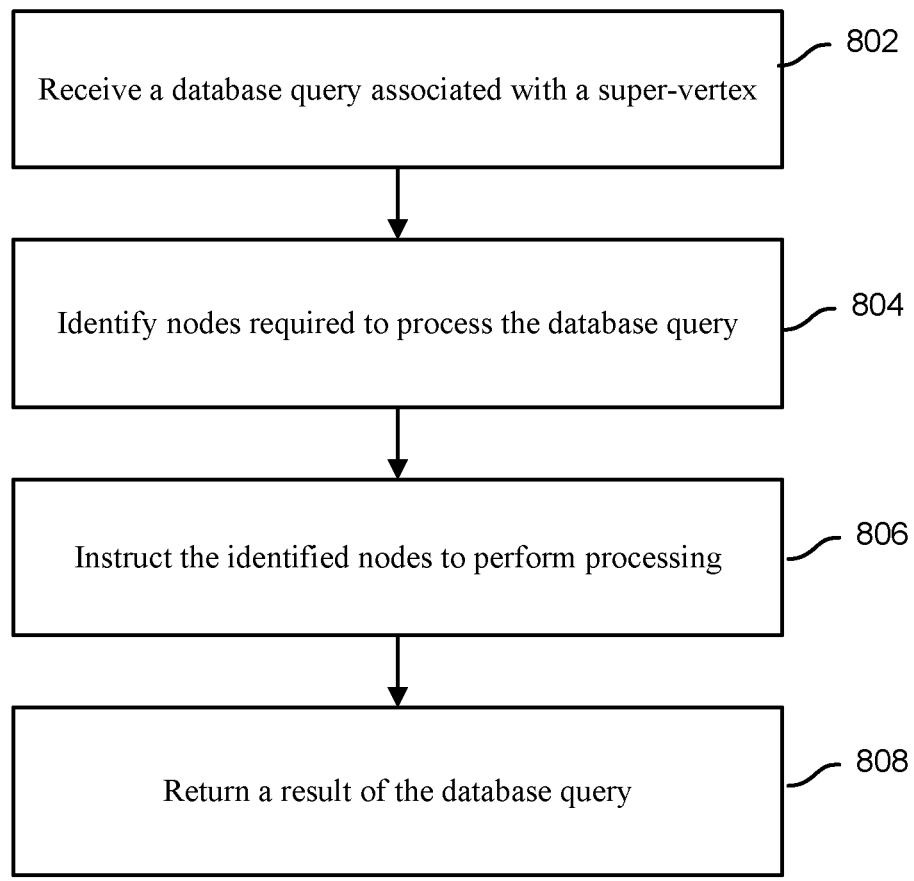
FIG. 8 is a flowchart illustrating an embodiment of a process for processing a query associated with a super-vertex at a node of the super-vertex.

FIG. 8 is a flowchart illustrating an embodiment of a process for processing a query associated with a super-vertex at a node of the super-vertex. The process of FIG. 8 may be implemented on one or more nodes of node cluster 202 and/or node cluster 204.

At 802, a database query associated with a super-vertex is received. The database query is associated with the super-vertex and requires data of the super-vertex to process the database query. In some embodiments, the database query is received at a main node of the super-vertex that has been partitioned and the main node is assigned to manage a truncated vertex data of the super-vertex using at least a portion of the process of FIG. 7. In some embodiments, the database query is received at a remote node that has been assigned to a vertex representative of the super-vertex.

At 804, nodes required to process the database query are identified. In some embodiments, it is determined whether the database query can be processed at a current node or requires processing by other nodes. For example, the query is received at a main node of the super-vertex and it is determined whether the database query can be processed using only data included in a truncated vertex data stored at the storage of the main node or the database query requires vertex representative data assigned to one or more remote nodes. In one example, a database query that requires traversal of all edges connected to the super-vertex is identified as requiring vertex representative data of the super-vertex. In another example, a database query that only requires data stored in the truncated vertex data can be processed by the main node of the super-vertex without the remote nodes.

Before partitioning data of the super-vertex to remote nodes, a database query that requires traversal of all edges of the super-vertex would typically be handled by the main node assigned to the super-vertex. However, by partitioning the data of the super-vertex to vertex representatives, the processing required to traverse/process all of the vertices connected to the super-vertex can be divided amongst the various nodes assigned to different portions of the super-vertex. For example, each remote node assigned to each of the vertex representatives is instructed to traverse/process its portion and provide its result back to the main vertex. The main vertex may then combine/process the various results from remote nodes and return an overall result of the database query. In some embodiments in order to provide additional fault tolerance and parallelization, rather than requiring the results to be provided back to the main vertex, any node in the cluster may receive and aggregate the results from all the nodes that store vertex representatives.

In some embodiments, the query is a query received at a remote node of the super-vertex and determining the required processing includes determining whether the query that requires data of the super-vertex can be handled by the remote node using a local vertex representative rather than requesting processing to the main node of the super-vertex. For example, the received query is a query to identify a list of vertices that are connected to both a specific vertex assigned to the remote node and a super-vertex assigned to a different main node. Without using a vertex representative, processing this query would require traversal of all connected vertices of the super-vertex as well as all connected vertices of the specific vertex to identify common vertices between them. Requesting traversals of all of the connected vertices of the super-vertex to its main node may require a large amount of resources of the main node. However, if the remote node has been assigned a vertex representative of the super-vertex, the vertex representative may already include an inverse list (e.g., partial vertex-centric index of the super-vertex) of all vertices of the remote node connected to the super-vertex and this list can be compared with the list of connected vertices of the local vertex to determine a result of the query without needing to access the main node of the super-vertex.

At 806, the identified nodes are instructed to perform processing. For example, in the event it is determined that only the local node is required to handle the query, the local node performs processing of the query and in the event it is determined that processing by other nodes is required, the other nodes are instructed to perform their respective processing. In some embodiments, instructing the nodes includes coordinating processing between the nodes. For example, various different processing instructions are provided to appropriate nodes in the appropriate order (e.g., based on processing order and data dependency).

At 808, a result of the database query is returned. In some embodiments, returning the result includes combining and/or processing results received from one or more nodes to determine a final result to be returned as a result to the database query. In some cases, by dividing required processing of the query amongst a plurality of different nodes and then combining the results, more efficient processing is achieved due to distributed processing. In some embodiments, by allowing data of the super-vertex to be obtained/traversed from a local vertex representative rather than from a main node assigned to the super-vertex, more efficient query processing has been achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for partitioning a graph database, comprising:
a processor; and
a memory coupled with the processor, wherein the memory is configured to provide the processor with instructions which when executed cause the processor to:
assign to a plurality of nodes a plurality of vertices of a graph database, wherein the vertices of the graph database are connected by edges that indicate relationships between the vertices; and
designate a vertex of the graph database as a super-vertex that is split into a truncated vertex and at least one vertex representative, wherein the designating of the vertex of the graph database as the super-vertex that is split into the truncated vertex and the at least one vertex representative comprises to:
determine whether the super-vertex is connected to at least a threshold number of other vertices; and
in response to a determination that the super-vertex is connected to at least the threshold number of other vertices:
split a first portion of the super-vertex corresponding to edges of the super-vertex that are directed from other vertices to the super-vertex, wherein the first portion is identified by the at least one vertex representative; and
retain a second portion of the super-vertex corresponding to edges of the super-vertex that are directed from the super-vertex to other connected vertices, wherein the second portion is identified by the truncated vertex.

2. The system of claim 1, wherein the truncated vertex is assigned to a main node and the at least one vertex representative is assigned to a different node.

3. The system of claim 2, wherein a database query associated with the super-vertex received at the different node is handled by the different node using its assigned vertex representative without processing by the main node.

4. The system of claim 1, wherein the truncated vertex is stored at a storage of a main node and the at least one vertex representative is stored at a storage of a different node.

5. The system of claim 1, wherein each vertex representative identifies one or more edges of the super-vertex that are not identified by the truncated vertex.

6. The system of claim 1, wherein the vertex was designated as the super-vertex based on an indication from an administrator.

7. The system of claim 1, wherein designating the vertex of the graph database as the super-vertex includes automatically detecting that the vertex meets a criteria to be designated as the super-vertex.

8. The system of claim 1, wherein only edges of the super-vertex that match a criteria are eligible to be split to the at least one vertex representative from the truncated vertex.

9. The system of claim 8, wherein the criteria specifies an edge directionality or edge label.

10. The system of claim 1, wherein the at least one vertex representative specifies a vertex-centric index including identifiers, labels, properties, or directionality of edges of the super-vertex.

11. The system of claim 1, wherein the at least one vertex representative assigned to an assigned node includes an index listing any other vertices assigned to the assigned node that are also connected to the super-vertex.

12. The system of claim 1, wherein in the event a connected vertex connected to the super-vertex and assigned to an assigned node that has also been assigned at least one vertex representative is removed from the assigned node, the at least one vertex representative is automatically modified to reflect the removal of the connected vertex.

13. The system of claim 1, wherein the super-vertex is split into the truncated vertex and a plurality of vertex representatives.

14. The system of claim 13, wherein each of the plurality of vertex representatives identifies a set of edges that are different from other vertex representatives.

15. The system of claim 13, wherein to process a database query of the graph database associated with the super-vertex, each of a plurality of nodes assigned to each of the plurality of vertex representatives is instructed to perform processing with respect to its assigned vertex representative and results from the plurality of nodes are combined to determine a response to the database query.

16. The system of claim 1, wherein the super-vertex is one of a plurality of super-vertices of the graph database.

17. A method for partitioning a graph database, comprising:
assigning to a plurality of nodes a plurality of vertices of a graph database, wherein the vertices of the graph database are connected by edges that indicate relationships between the vertices; and
designating, using a processor, a vertex of the graph database as a super-vertex that is split into a truncated vertex and at least one vertex representative, wherein the designating of the vertex of the graph database as the super-vertex that is split into the truncated vertex and the at least one vertex representative comprises:
determining whether the super-vertex is connected to at least a threshold number of other vertices; and
in response to a determination that the super-vertex is connected to at least the threshold number of other vertices:
splitting a first portion of the super-vertex corresponding to edges of the super-vertex that are directed from other vertices to the super-vertex, wherein the first portion is identified by the at least one vertex representative; and
retaining a second portion of the super-vertex corresponding to edges of the super-vertex that are directed from the super-vertex to other connected vertices, wherein the second portion is identified by the truncated vertex.

18. A computer program product for partitioning a graph database, the computer program product being embodied in a non-transitory computer readable storage medium and comprising computer instructions for:
assigning to a plurality of nodes a plurality of vertices of a graph database, wherein the vertices of the graph database are connected by edges that indicate relationships between the vertices; and
designating a vertex of the graph database as a super-vertex that is split into a truncated vertex and at least one vertex representative, wherein the designating of the vertex of the graph database as the super-vertex that is split into the truncated vertex and the at least one vertex representative comprises:

determining whether the super-vertex is connected to at least a threshold number of other vertices; and splitting a first portion of the super-vertex corresponding to edges of the super-vertex that are directed from other vertices to the super-vertex, wherein the first portion is identified by the at least one vertex representative; and retaining a second portion of the super-vertex corresponding to edges of the super-vertex that are directed from the super-vertex to other connected vertices, wherein the second portion is identified by the truncated vertex.

\* \* \* \* \*